United States Patent [19]
Reed

[11] Patent Number: 5,804,068
[45] Date of Patent: Sep. 8, 1998

[54] MAGNETIC FLUID TREATMENT DEVICE

[76] Inventor: William C. Reed, 5753 Whistlewood Cir., Sarasota, Fla. 34232

[21] Appl. No.: 690,746

[22] Filed: Aug. 1, 1996

[51] Int. Cl.⁶ .................................................. B01D 35/06
[52] U.S. Cl. ........................... 210/222; 206/818; 426/234
[58] Field of Search .................................. 210/222, 223, 210/695; 206/818; 426/234

[56] References Cited

U.S. PATENT DOCUMENTS

| | | | |
|---|---|---|---|
| 5,113,751 | 5/1992 | Holcomb et al. | 206/818 |
| 5,556,654 | 9/1996 | Fregeau | 426/234 |

*Primary Examiner*—David A. Reifsnyder
*Attorney, Agent, or Firm*—Malloy & Malloy, P.A.

[57] ABSTRACT

A fluid treatment device having a fluid containment housing with a first containment region and a second containment region. The first and second containment regions are connected in fluid flow communication with one another by a generally narrow, elongate transfer channel that permits fluid to flow therethrough from one containment region to another while the fluid defines a natural vortex. Moreover, a generally powerful, polarized magnet is disposed about the transfer channel in order to deliver a concentrated, polarized magnetic charge into the transfer channel, thereby acting on the fluid flowing in the natural vortex through the transfer channel and polarizing it until the fluid molecules thereof are gradually rearranged from a normal agglomerated state into a more linear, organized and substantially more permeable state that will increase a body's ability to absorb and assimilate the fluid and obtain benefits therefrom.

14 Claims, 1 Drawing Sheet

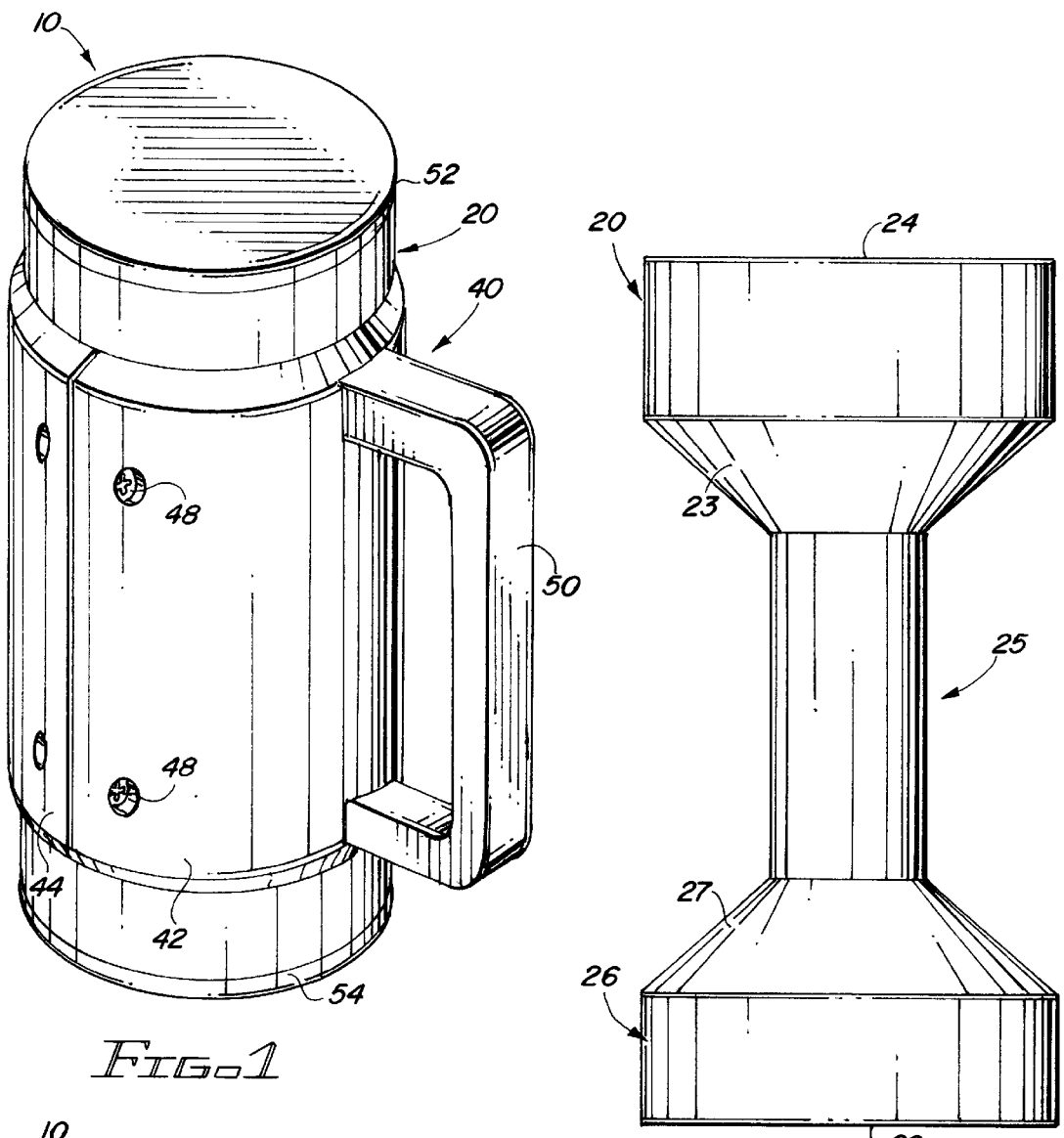
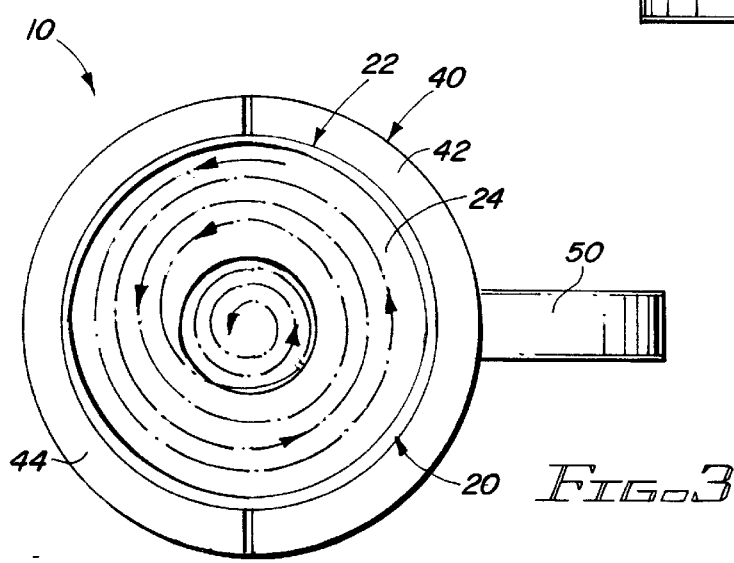

MAGNETIC FLUID TREATMENT DEVICE

BACKGROUND OF THE INVENTION

1. Field of the Invention

The present invention relates to a fluid treatment device structured to contain a fluid, such as a nutritional beverage or medicinal liquid, and effectively and substantially increase the permeability and absorbability of that fluid, and especially the nutrients contained therein, into a body, thereby maximizing the beneficial effects achieved by that fluid throughout that material mass and minimizing unused, wasted benefits of the fluid.

2. Description of the Related Art

A variety of fluids have been developed in numerous industries for the purposes of treating, effecting, or otherwise benefiting a solid material mass to which they are applied. This is especially true with regard to nutritional fluids and/or medicinal fluids which are either topically or internally applied to a body. Unfortunately, however, due to the normal properties of that nutritional or medicinal fluid, and the density of the material mass, namely the human body to which they are applied, a significant quantity of the benefits to be provided by that fluid are lost before they can be fully assimilated by the body. Specifically, with regard to various nutritional beverages, such as fruit juices, vitamin drinks, and the like, once those fluids are consumed by a user it takes the body some time in order to effectively integrate the beneficial effects thereof into the body. Often, however, the normal digestive time and the required assimilation time of the nutrients come into conflict with one another, and the body will eliminate the fluid while it still has substantial quantities of unused nutrients contained therein. Similarly, with medicinal liquids and topically applied balms and lotions, such as a conventional burn cream, when these lotions are topically applied to an infected area there is only a limited amount of absorption into the human skin, and thereby the effects of the lotion are limited. In particular, the effects are limited by both the shallow depth to which the lotion is absorbed, thereby leaving underlying skin layers unaffected and untreated, and the slow pace at which the lotion is absorbed, which can either lead to long suffering or can hinder complete healing if certain effected areas are not properly and quickly treated.

For these reasons, it would be highly beneficial to provide a fluid treatment device wherein a fluid could be contained and easily and cost effectively treated in order to significantly increase its effectiveness. Such a device should be available to treat the fluid at the time of its usage, thereby maximizing the beneficial effects of the treatment, and should significantly increase the permeability of the fluid, thereby increasing its rate of absorption into the body and maximizing the beneficial effects of the fluid which are actually utilized. The fluid treatment device of the present invention is such a device.

SUMMARY OF THE INVENTION

The present invention is directed towards a fluid treatment device wherein a fluid which is normally structured to provide some beneficial results is introduced so as to substantially increase its permeability and effectiveness. The fluid treatment device includes primarily a fluid containment housing. The fluid containment housing is generally elongate in shape and is divided into a first containment region and a second containment region. Moveover, the first containment region and second containment region are connected with one another in fluid flow communication, by a generally narrow transfer channel. Accordingly, each time the fluid containment housing is inverted, fluid flows from one of the containment regions to another of the containment regions. Furthermore, the fluid containment housing is structured such that as the fluid flows from one containment region to the other, the fluid will flow through the transfer channel forming a natural vortex.

The fluid treatment device of the present invention further includes magnetic means disposed about the transfer channel. The magnetic means are specifically structured to deliver a concentrated, polarized magnetic charge into the transfer channel so that the fluid, which is flowing in the natural vortex through the transfer channel, is polarized. Furthermore, the magnetic means, upon affecting the fluid flowing though the transfer channel will result in fluid molecules of that fluid being gradually rearranged from a normal agglomerated state into a more linear, organized, and substantially more permeable state which increases the body's ability to absorb and assimilate the fluid and obtain the benefits therefrom.

It is an object of the present invention to provide a fluid treatment device which can effectively polarize a fluid contained therein and treated thereby in order to gradually rearrange its fluid molecules into a more linear, organized and substantially more permeable state, thereby increasing a body's ability to absorb and assimilate the fluid as well as obtain benefits therefrom.

It is a further object of the present invention is to provide a food treatment device which substantially increases the permeability and effectiveness of a fluid and is hand-held and convenient to utilize.

Also an object of the present invention is to provide a fluid treatment device which is easy to clean and/or repair for extended, repeated uses.

Another object of the present invention is to provide a fluid treatment device which maximizes the effects of a magnetic means due to the manner in which fluid flow therethrough is directed.

Yet another object of the present invention is to provide a fluid treatment device which is convenient and easy to implement in any situation, thereby significantly increasing its useability and desirability.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the fluid treatment device of the present invention;

FIG. 2 is a side, isolated plan view of the fluid containment housing of the fluid treatment device of the present invention; and FIG. 3 is a top plan view of the fluid treatment device of the present invention.

Like reference numerals refer to like parts throughout the several views of the drawings.

DETAILED DESCRIPTION OF THE PREFERRED EMBODIMENTS

Shown throughout the FIGS., the present invention is directed towards a fluid treatment device, generally indicated as 10. In particular, the fluid treatment device 10 is structured to receive a quantity of a fluid, such as a fruit juice or other vitamin, nutrient, or medication containing fluid, so as to facilitate the effective treatment of that fluid and convert it into a more effective, more readily assimilatable and absorbable form.

The fluid treatment device 10 of the present invention includes primarily a fluid containment housing, generally 20. The fluid containment housing, preferably includes a generally elongate, hourglass type shape and may be configured in a variety of sizes in order to hold more or less fluid as needed. In particular, the fluid containment housing 20 includes a first containment region 22 and a second containment region 26. Depending upon the orientation of the fluid containment housing 20, either the first containment region 22 or the second containment region 26 may be disposed above or below one another.

Looking further to FIG. 2, the first containment region 22 and the second containment region 26 are connected in fluid flow communication with one another by a generally narrow transfer channel 25. The transfer channel 25 preferably includes a tubular configuration and is generally elongate so as to maximize a time which a fluid spends within the transfer channel 25 as it flows therethrough. In particular, by inverting the fluid containment housing 20, fluid will naturally flow from one of the containment regions 22 and 26 into the other one through the transfer channel 25. Moreover, each of the containment regions 22 and 26 preferably includes a tapered region 23 and 27 which tapers down in a funnel type configuration to the generally narrow transfer channel 25. As such, when the fluid flows from one containment region to the other, the fluid will tend to spiral downward so as to flow in and form a natural vortex through the transfer channel 25 into the opposite containment region.

At least one of the containment regions 22 includes an opening 24 formed therein and structured to permit the introduction and/or removal of the fluid to and from the fluid containment housing 20 therethrough. In the preferred embodiment, the entire end of the first containment region 22 will define the opening 24. Moreover, in the preferred embodiment, and as either containment region 22 or 26 may be the upper containment region into which fluid is introduced or from which fluid is poured, the second containment region 26 will also include an opening 28, such as an entirely open bottom end 28. Accordingly, to ensure that the fluid within the fluid containment housing 20 is maintained therein as it is being passed through the transfer channel 25 and treated, and until its ultimate dispensing is necessary, each of the openings 24 and 28 are structured to be sealed in a generally fluid impervious manner. In the preferred embodiment, both the first fluid containment region 22 and the second fluid containment region 26 include a removable cap element 52 and 54. The removable cap element 52 and 54 is structured to completely seal the opening 24 and 28 and thereby permit the fluid containment housing 20 to be effectively inverted during treatment of the fluid.

Disposed in surrounding relation about the transfer channel 25 are magnetic means 40. The magnetic means 40 are specifically structured and disposed to deliver a concentrated, polarized magnetic charge into the transfer channel 25. Accordingly, as the fluid containment housing 20 is inverted and the fluid passes through the transfer channel 25, the magnetic charge of the magnetic means 40 is concentrated on the fluid. Furthermore, because the fluid is flowing in a vortex, the magnetic affects on the fluid are greatly increased. In particular, as the fluid flows through the transfer channel 25 and is affected by the magnetic means 40, the fluid is polarized and the fluid molecules which comprise the fluid are gradually rearranged from their normal agglomerated state into a more linear, organized, and substantially more permeable state. Specifically, fluid molecules when in their normal, unaffected state are generally clumped together in a random, unorganized manner. Naturally, when these clumped together fluid molecules encounter a solid material surface into which absorption is preferred, the absorption is substantially hindered due to the bunching and unordered state of the fluid molecules. This natural occurrence can be likened to a bunch of grapes being pushed through a grate having openings only slightly larger than each individual grape. Naturally, it is quite time consuming for all of the grapes to penetrate through only a few openings beneath the clumped group, and in the long run some may not even pass through. Conversely, by polarizing the fluid with a sufficiently strong magnetic charge and with sufficient repetitions of the treatment, the fluid molecules become substantially linear and organized, akin to the separation of the grapes from the bundle and to their dispersement. As a result, much easier penetration, such as that of one grape per opening in the grate, is achieved, and the entire process is much more effective and much more rapid. In the field of nutritional and curative fluids, and even relating to fluid balms or lotions which are topically applied, such increased permeability and increased absorbability by the body will substantially increase the effectiveness of the fluid as the body is able to assimilate the beneficial substances more completely and much more quickly, and thereby obtain substantially greater benefits therefrom.

As seen in FIGS. 1 and 2, the magnetic means preferably includes a generally powerful, polarized magnet 40 disposed about the transfer channel 25. Moreover, so as to facilitate cleaning and/or replacement of the fluid containment housing 20, the magnet 40 is structured to be removable. In the preferred embodiment illustrated in the Figures, the magnet 40 will include two halves 42 and 44 which wrap around the transfer channel 25 and are secured with one another by any of a variety of fasteners, such as a plurality of bolts 48 which extend from one half 42 into the other half 44. This removability is substantially beneficial as it allows the more fragile fluid containment housing 20 to be replaced if it becomes stained after an extended period of time, becomes chipped or broken, or if a user merely wishes to maintain a separate fluid containment housing 20 for specific types of fluids.

Also, as illustrated in FIG. 1, the fluid treatment device 10 preferably includes a handle 50. Although the handle 50 may be incorporated in any variety of fashions, in the preferred embodiment the handle 50 will be integrated as part of the magnet 40 thereby providing an effective central area to hold and invert the fluid containment housing 20 when treatment of the fluid is being achieved.

In order to maximize the effects of the magnetic means 40 on the fluid passing through the transfer channel 25, the transfer channel 25, and preferably the entire fluid containment housing 20 is formed of a non-magnetic material. Accordingly, the magnetic charge produced by the magnetic means 40 is able to flow unhindered through the transfer channel 25 and directly effect and be concentrated upon the fluid flowing through the transfer channel 25. In the preferred embodiments, the transfer channel 25 will be formed of glass or plastic.

In the preferred embodiment, the magnetic means 40 will include an approximately 4500 gauss magnet. It should be noted, however, that different types of fluid will require more or less cycles of flow through the transfer channel 25. For example, some easily treated fluids may merely require a small number of passes through the transfer channel 25, while a more difficult to treat fluid may require a more extended number of repetitions and passes through the transfer channel 25. These variants can also relate to the power of the magnet, as some limited uses will require a less powerful magnet.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A fluid treatment device comprising:

a fluid containment housing, said fluid containment housing including a first containment region and a second containment region, said first containment region and said second containment region being connected in fluid flow communication with one another by a generally narrow transfer channel, magnetic means disposed about said transfer channel and structured to deliver a concentrated, polarized magnetic charge into said transfer channel, and an upper one of said containment regions being generally wider than said transfer channel and being coupled thereto such that the fluid flow is funneled from said wider, upper containment region into said narrower transfer channel generally as a result of gravity thereby causing said fluid to flow in a natural vortex pattern through said transfer channel, and such that the fluid, flowing in said natural vortex pattern is polarized and fluid molecules thereof are gradually rearranged from a normal agglomerated state into a more linear, organized, and substantially more permeable state, thereby increasing a bodies ability to absorb and assimilate the fluid and obtain benefits therefrom.

2. A fluid treatment device as recited in claim 1 wherein said first and said second containment regions include a tapered configuration which narrows towards said transfer channel.

3. A fluid treatment device as recited in claim 1 wherein said transfer channel is formed of a non-magnetic material which permits the substantially unhindered flow of said magnetic charge therethrough so as to be concentrated on the fluid flowing through said transfer channel.

4. A fluid treatment device as recited in claim 3 wherein said transfer channel is made of glass.

5. A fluid treatment device as recited in claim 3 wherein said transfer channel is made of plastic.

6. A fluid treatment device as recited in claim 1 wherein said magnetic means includes a polarized magnet disposed about said transfer channel.

7. A fluid treatment device as recited in claim 6 wherein said polarized magnet is structured to be removably secured in surrounding relation about said transfer channel.

8. A fluid treatment device as recited in claim 1 further including handle means structured and disposed to facilitate holding and manipulation of said fluid containment housing.

9. A fluid treatment device as recited in claim 1 wherein said first containment region includes an opening formed therein and structured to permit the introduction and removal of the fluid to and from said fluid containment housing.

10. A fluid treatment device as recited in claim 9 further including a removable cap element structured and disposed to seal said opening in said first containment region so as to permit said fluid containment housing to be inverted in order to further expose the fluid to said magnetic charge and further polarize the fluid and rearrange said fluid molecules from said normal agglomerated state into said more linear, organized, and substantially more permeable state.

11. A fluid treatment device as recited in claim 1 wherein said magnetic means includes an approximately 4500 gauss magnet.

12. A fluid treatment device comprising:

a fluid containment housing, said fluid containment housing including a first containment region and a second containment region, said first containment region and said second containment region being connected in fluid flow communication with one another by a generally narrow transfer channel, magnetic means disposed about said transfer channel and structured to deliver a concentrated, polarized magnetic charge into said transfer channel, and at least an upper one of said containment regions including a tapered configuration which narrows towards said transfer channel, said tapered configuration of said upper one of said containment regions being structured to funnel a fluid from said upper containment region into said transfer channel generally as a result of gravity and in a vortex flow pattern which increases an effect of said polarized magnetic field on the fluid.

13. A fluid treatment device as recited in claim 12 further including handle means structured and disposed to facilitate holding and manipulation of said fluid containment housing, said handle means including said magnetic means therein.

14. A fluid treatment device comprising:

a fluid containment housing, said fluid containment housing including a first containment region and a second containment region, said first containment region and said second containment region being connected in fluid flow communication with one another by a generally narrow transfer channel, magnetic means disposed about said transfer channel and structured to deliver a concentrated, polarized magnetic charge into said transfer channel, said fluid containment housing being structured to be inverted between a first orientation and a second orientation so as to selectively and alternatingly make said first and said second containment regions an upper one of said containment regions, said first containment region and said second containment region each including a tapered configuration which narrows towards said transfer channel such that said tapered configuration of said upper one of said containment regions in both said first configuration and said second configuration of said containment housing is structured to funnel a fluid from said upper containment region into said transfer channel generally as a result of gravity and in a vortex flow pattern which increases an effect of said polarized magnetic field on the fluid.

* * * * *